US007227453B2

(12) United States Patent
Arunkumar

(10) Patent No.: US 7,227,453 B2
(45) Date of Patent: Jun. 5, 2007

(54) MULTI-CONTROL TELEMATICS IN A VEHICLE

(75) Inventor: Uma Arunkumar, Novi, MI (US)

(73) Assignee: General Motors Corporation, Detroit, MI (US)

( * ) Notice: Subject to any disclaimer, the term of this patent is extended or adjusted under 35 U.S.C. 154(b) by 755 days.

(21) Appl. No.: 10/141,431

(22) Filed: May 8, 2002

(65) Prior Publication Data

US 2003/0210159 A1 Nov. 13, 2003

(51) Int. Cl.
*B60R 25/10* (2006.01)

(52) U.S. Cl. ................. 340/426.16; 340/461; 340/905; 340/988; 340/990; 340/995.1

(58) Field of Classification Search ................ 340/988, 340/426.16, 426.19, 426.2, 426.15, 903, 340/905, 990, 995.1, 901, 439, 461; 455/179.1, 455/187.1; 701/24, 200, 209, 211
See application file for complete search history.

(56) References Cited

U.S. PATENT DOCUMENTS 4,176,250 A * 11/1979 Berglind ..................... 370/212
4,463,349 A * 7/1984 Mochida et al. ........... 340/5.31
5,334,974 A * 8/1994 Simms et al. ............... 340/990
5,917,405 A * 6/1999 Joao ....................... 340/426.17
6,169,515 B1 * 1/2001 Mannings et al. ....... 342/357.1
6,304,173 B2 * 10/2001 Pala et al. .................. 340/461
6,351,705 B1 * 2/2002 Yoshioka .................... 701/200
6,542,818 B1 * 4/2003 Oesterling .................. 701/209
6,564,127 B1 * 5/2003 Bauerle et al. ............... 701/33
6,567,745 B2 * 5/2003 Fuchs et al. ................ 701/209

* cited by examiner

*Primary Examiner*—Hung Nguyen
(74) *Attorney, Agent, or Firm*—Anthony Luke Simon

(57) ABSTRACT

An apparatus and method allow either the driver or a passenger in a vehicle to operate a telematic unit in the vehicle. Communication requests may be prioritized, depending upon the type of communication desired and whether the request is being made by the driver or a passenger. Visual display units for the driver and passenger are positioned such that the passenger visual display unit is visible to a passenger seated in the passenger seat and not visible to a driver seated in the driver seat. Information displayed on the driver visual display unit may be restricted to certain types of communications, or include only limited information, so as not to distract the driver. A full display may be provided to the passenger, so that the passenger can assist the driver with verbal instructions based upon information included in the full display, viewable by the passenger but not the driver.

26 Claims, 3 Drawing Sheets

MULTI-CONTROL TELEMATICS IN A VEHICLE

TECHNICAL FIELD OF THE INVENTION

This invention relates to vehicle telematic systems and more particularly to operation of a telematic unit from multiple locations within a vehicle.

BACKGROUND OF THE INVENTION

Modern vehicles often include an on board vehicle communication unit, known as a telematic unit, for carrying on various types of communications between the telematic unit and a server or a GPS satellite. These communications may include telephone calls and navigation information.

Typically, the vehicle will include a control unit, placed within reach of the driver for operating the telematic unit, and having one or more buttons that can be pressed to request that the telematic unit initiate or terminate a particular type of communication. For convenience in operating the vehicle, the telematic unit may include microphones and speakers so that the driver can utilize the telematic unit in a hands-free mode. The speakers allow a person in the vehicle to hear communications, or audible messages from the telematic unit relating to the status of a request for initiating a communication, without having to wear a headset or hold a handset to their ear. The microphones allow a person in the vehicle to control the telematic unit by simply speaking a voice command that will be picked up by the microphone and interpreted by a voice recognition circuit in the telematic unit.

Some vehicles may include a visual display that can be seen by the driver, connected to the telematic unit, for displaying navigation information or information regarding the status of a telephone call.

Advantages may be obtained by allowing such a telematic unit to be operated by a passenger in the vehicle.

SUMMARY OF THE INVENTION

My invention provides an apparatus and method for either the driver or a passenger in a vehicle to operate a telematic unit in the vehicle.

One form of my invention provides a method for operating a telematic unit in a vehicle having a driver seat for a driver and a passenger seat for a passenger, a driver control unit operable by the driver, and a passenger control unit operable by the passenger, with the passenger control unit being located out of reach of the driver when the driver is seated in the driver seat. The method includes, generating a communication initiation request from one of the driver or passenger control units for initiating communication between the telematic unit and a server. The method may also include prioritizing communication initiation requests from the driver and passenger control units. The method may further include prioritizing between a first and a second type of communication request, or giving communications in process priority over subsequently received requests.

An apparatus according to my invention may also include driver and passenger visual display units, with the driver visual display unit being positioned to be visible by a driver seated in the driver seat, and the passenger display visual display unit positioned to be visible to a passenger seated in the passenger seat and not visible to a driver seated in the driver seat. The driver and passenger control units may be adapted for requesting a first and a second type of communication, with the method further comprising displaying only information relating to the first type of communication on the driver visual display unit. The method may further include displaying only limited information relating to the second type of communication on the driver display unit.

My invention may take the form of an apparatus, method, or a computer program on a computer readable medium for allowing operation of the telematic unit by a passenger in the vehicle.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
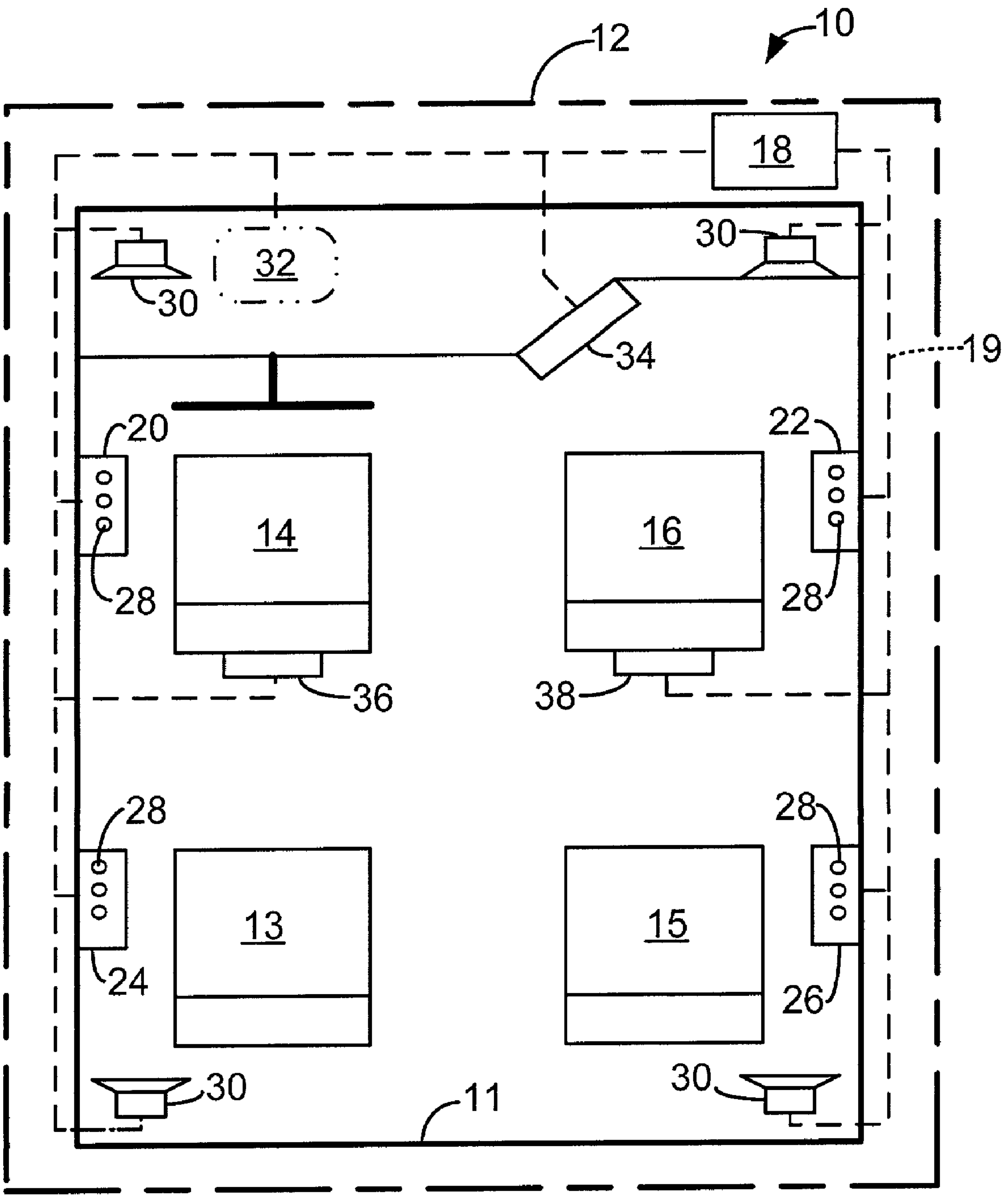
FIG. 1 is a schematic representation of an exemplary embodiment of an apparatus, according to my invention, in the form of a vehicle having a telematic unit and control units for either the driver or one of the passengers in the vehicle to operate and communicate through the telematic unit.

FIG. 1 depicts an exemplary embodiment of an apparatus 10 for communication in a vehicle 12 having a passenger compartment 11 including a driver seat 14 for a driver and a front passenger seat 16 for a front seat passenger. The passenger compartment 11 of the exemplary embodiment also includes a left and a right rear passenger seat 13, 15.

The apparatus 10 includes a telematic unit 18 in the vehicle 12, and driver and passenger control units 20, 22, 24, 26 connected to the telematic unit 18 via a circuit 19, for generating a communication request to initiate a communication between the telematic unit 18 and a server (not shown). The driver control unit 20 is operable by the driver, and the passenger control units 22, 24, 26 are operable by the passengers, with the passenger control units 22, 24, 26 being located out of reach of the driver when the driver is seated in the driver seat 14.

The apparatus 10 further includes elements within telematic unit 18 for prioritizing communication initiation requests from the driver and passenger control units 20, 22, 24, 26.

The driver and passenger control units 20, 22, 24, 26 each include a series of push buttons 28 adapted for requesting a first and a second type of communication from the telematic unit 18. For the purpose of illustration, in the following description, the first type of communication will be a telephone call, and the second type of communication will be navigation information for guiding the vehicle to a destination. It will be understood, however, that other types of communication could also be used.

The apparatus 10 also includes a set of speakers 30 connected to the telematic unit 18 by the circuit 19 for annunciating and audibly playing a communication within the passenger compartment 11. The control units 20, 22, 24, 26 each include a microphone for receiving voice commands from a person seated in each of the seats 14, 16, 13, 15 respectively adjacent each control unit 20, 22, 24, 26.

Driver and passenger visual display units 32, 34, 36 38, connected to the telematic unit 18 via the circuit 19, are provided for displaying all or a portion of the requested communication, or information relating to the status of a communication initiation request, to the driver, the front seat passenger, and the left and right rear seat passengers, respectively. The driver visual display unit 32 is positioned to be visible by the driver, when he or she is seated in the driver seat 14, and is preferably provided in the form of a head-up display 32 projected onto the windshield of the vehicle 12, so that the driver may view information on the head-up display 32 without diverting his gaze from the road.

The front seat passenger display visual display unit 34 is positioned to be visible to a passenger seated in the front passenger seat 16, and not visible to a driver seated in the driver seat 14. The visual display units 36 and 38 for the left and right rear passenger seats 13, 15 respectively are positioned on the backs of the driver and front passenger seats 14, 16, so that they cannot be viewed by the driver from the driver seat 14, and are primarily viewable from their respective rear seat 13, 15.

As will be described in greater detail below, it may be desirable for facilitating full attention of the driver to the road that the telematic unit 18 be configured to display only information relating to telephone calls on the driver head-up display 32. Detailed navigation information, such as text giving turn-by-turn driving directions, or maps may be displayed only on the passenger visual display units 34, 36, 38, however, so that one of the passengers may view the detailed information and assist the driver through verbal directions. I also contemplate that in some embodiments of my invention, the telematic unit 18 may provide the driver with audible driving directions through the speakers 30, and/or limited information relating to navigation in the form of arrows or other indicators showing the driver where to turn, etc., projected onto the head-up display 32.

Figure 2:
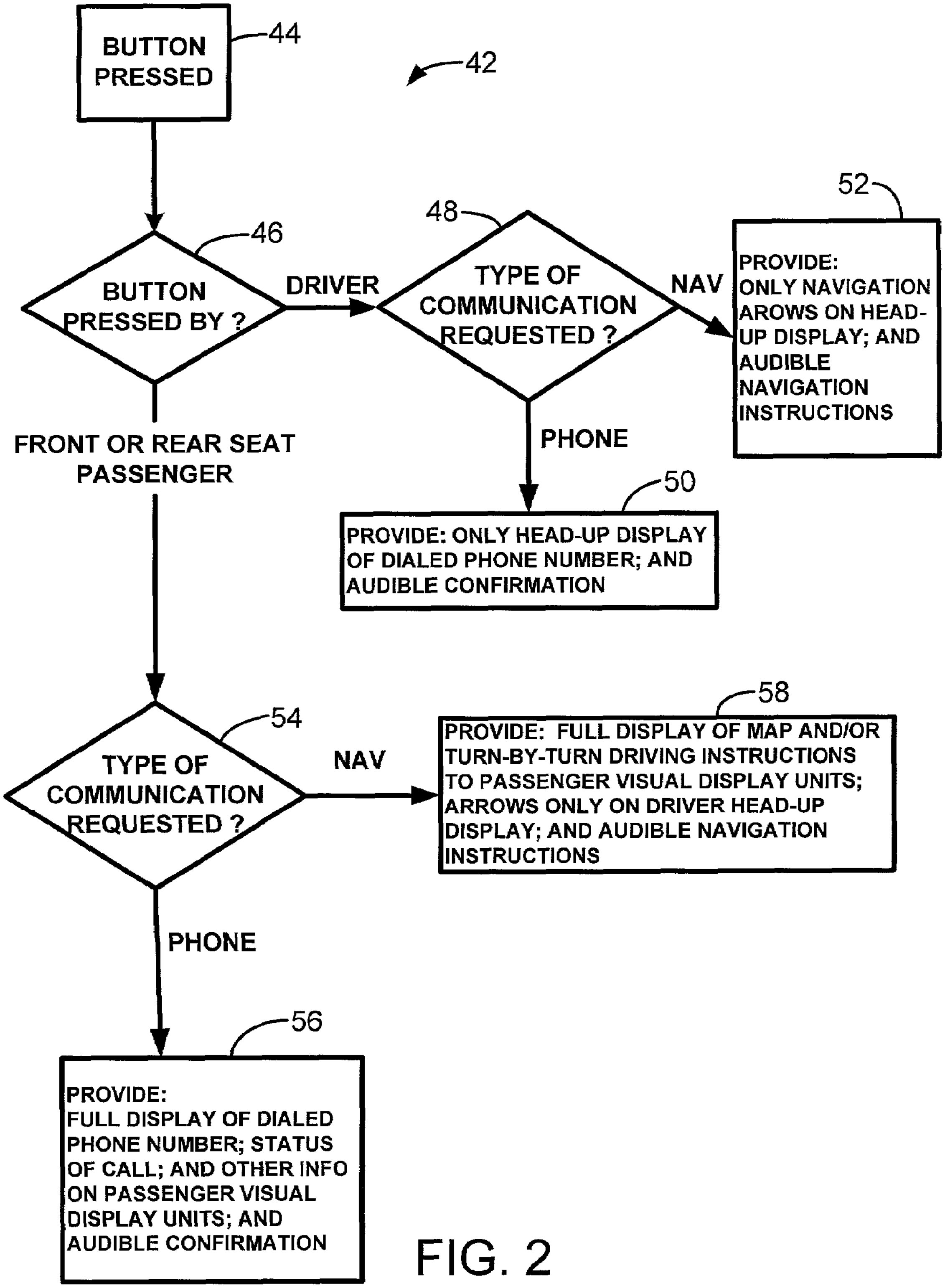
FIG. 2 is a flow chart showing a method of operating the exemplary apparatus of FIG. 1 by prioritizing requests for communication made by the driver and a passenger.

The telematic unit 18 of the apparatus 10 includes software and control elements for making priority decisions between communication initiation requests generated at the driver and passenger control units 20, 22, 24, 26, and between different types of communications, according to a method 42, shown in the flowchart of FIG. 2. When a button 28 on one of the control units 20, 22, 24, 26 is pushed to initiate a request for a desired type of communication, as shown at block 44, the telematic unit 18 determines whether the request is being made by the driver or a passenger, by determining which control unit 20, 22, 24, 26 was used to initiate the request, as shown by decision diamond 46.

If the request was initiated by the driver, the telematic unit 18 then determines whether the request is for a telephone call, or for navigation information, as shown at diamond 48. If the driver is requesting that a telephone communication be established, the telematic unit 18 will provide only the dialed phone number on the driver's head-up display 32, and annunciate an audible message from the speakers 30 confirming that a request has been received for initiating a telephone communication to the desired telephone number, as shown at block 50. The telematic unit 18 will then proceed to establish the telephone connection with the server. If the driver is requesting navigation information, however, the telematic unit will provide only navigation arrows on the head-up display 32, and audible navigation instructions, as shown in FIG. 3, and at block 52 of FIG. 2.

In similar fashion, as shown at diamond 54, where the request is made by a passenger, the telematic unit 18 determines whether the request is for initiating a telephone call, or for navigation information. If the passenger is requesting a telephone call be initiated, the telematic unit 18 will provide a full display on the passenger visual display unit 34, 36, 38 associated with the passenger control unit from which the request was made, together with audible confirmation through the speakers 30 that the request for initiating a telephone call has been received and is being processed, as shown at block 56. If the passenger is requesting navigation information, the telematic unit 18 will provide a full display of navigation information, such as a map or text giving detailed driving instructions, on the passenger visual display unit 34, 36, 38 associated with the passenger control unit from which the request was made, together with audible turn-by-turn instructions through the speakers 30, as shown at block 58. It may also be desirable in embodiments of my invention having a driver's head-up display 32 to provide limited visual navigation instructions in the form of arrows, or other indicators, projected on the head-up display 32.

It will be appreciated that by configuring and operating the apparatus 10 in the manner described above, that one of the passengers may serve as a navigator, giving additional verbal directions to help the driver, based on the full navigation display on the passenger visual display unit 34, 36, 38. The driver may direct his or her full attention to observing the road and operating the vehicle 12. It will further be appreciated that any of the passengers may conveniently access the various types of communications offered through the telematic unit 18.

Figure 3:
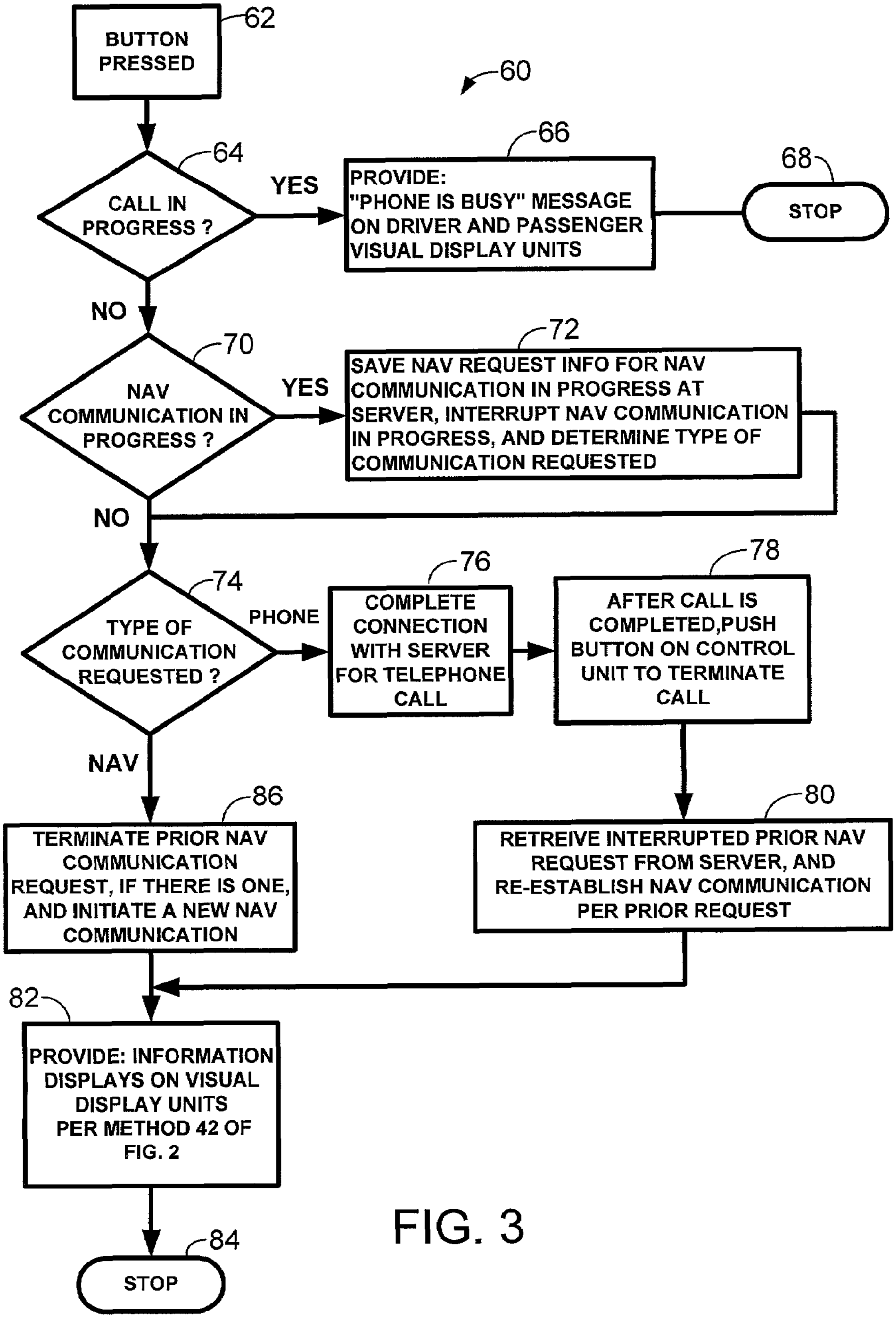
FIG. 3 is a flow chart showing a method of operating the exemplary apparatus of FIG. 1 by prioritizing requests for a first and a second type of communication.

I also contemplate that it may be desirable to configure the telematic unit 18 to further prioritize requests for initiating various types of communication, according to the method 60, shown by the flow chart in FIG. 3. In the method 60 shown in FIG. 3 requests for telephone calls, and telephone calls already in progress, are given priority over requests for navigation information. When a push button 28 is pressed on one of the control units 20, 22, 24, 26, as shown at block 62, the telematic unit 18 determines whether a phone call is already in progress, as shown at decision diamond 64. If a call is already in progress, a message indicating that the phone is busy is displayed on the head-up and visual display units 40, 34, 36, 38, and the request is terminated, as shown at blocks 66 and 68. Although an audible message can also be generated stating that the phone is busy, that message might interfere with the phone call in progress, and would thus be undesirable.

If there is no phone call in progress, the telematic unit next determines whether there is a navigation information communication already in progress, as shown at diamond 70. If there is a navigation communication already in progress, the request that initiated the navigation communication already in progress is saved at the server, and the telematic unit 18 proceeds with processing the new request, as shown at block 72.

The telematic unit 18 then determines whether the new request is for a telephone call or a navigation request, as shown at diamond 74. If the new request is to initiate a telephone communication, a telephone communication link is established with the server, as shown at block 76, allowing the driver or passenger making the call to communicate through the telematic unit 18 and server. When the call is completed, the person making the call presses one of the buttons 28 to terminate the call, as shown at block 78. The information relating to the navigation request that was interrupted to make the call is then retrieved from the server, as shown at block 80, and the navigation communication is re-established, according to the method 42 described above in relation to the flowchart of FIG. 2, to provide the appropriate information on the driver's head-up display and passenger visual display units 34, 36, 38, as shown at block 82, and the method 60 ends, as shown at block 84.

If the new request is for a navigation communication, as determined at diamond 74, the old navigation request stored at the server is deleted, if there is one, and the new request for initiating a navigation communication is processed by the telematic unit 18 and server, as shown at block 86. The new navigation communication is established and the appropriate information is provided on the driver's head-up display 32 and passenger visual display units 34, 36, 38, as shown at block 82, and the method 60 ends, as shown at block 84.

While the embodiments of my invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

The invention claimed is:

1. A method for operating a telematic unit in a vehicle having a driver seat for a driver and a passenger seat for a passenger, a driver control unit operable by the driver, and a passenger control unit operable by the passenger, the passenger control unit being located out of reach of the driver when the driver is seated in the driver seat, the method comprising:

generating a communication initiation request from one of the driver or passenger control units for initiating communication between the telematic unit and a server; and prioritizing communication initiation requests from the driver and passenger control units.

2. The method of claim 1 wherein communication initiation requests from the driver control unit always receive priority over requests from the passenger control unit.

3. The method of claim 1 wherein the vehicle includes one or more additional passenger seats each having a passenger control unit for that seat operable by a passenger seated in that seat, and the method further comprises prioritizing communication requests from the driver control unit and the passenger control units for each passenger seat.

4. The method of claim 3 wherein the vehicle includes a front driver seat, a front passenger seat, and a rear passenger seat, and wherein prioritizing communication requests comprises giving priority to communication requests from the driver control unit, the passenger control unit for the front passenger seat, and the control unit for the rear passenger seat, in that order.

5. The method of claim 1, further comprising:

determining if there is a Communication already in progress between the telematic unit and the server; and blocking communication initiation requests received while the communication already in progress continues.

6. The method of claim 1 wherein the driver and passenger control units are adapted for requesting a first and a second type of communication, and the method further comprises prioritizing the first and second type of communication request.

7. The method of claim 6, further comprising giving a request for the first type of communication priority over a request for the second type of communication, such that a request for the second type of communication will be denied if a communication of the first type is in progress.

8. The method of claim 7, further comprising giving a request for the first type of communication priority over the second type of communication, such that if a request for the first type of communication is received while a communication of the second type is in progress, the communication of the second type will be terminated and the request for the communication of the first will be processed by the telematic unit.

9. The method of claim 8, further comprising:

storing a request for the second type of communication when the communication of the second type is terminated; and re-establishing the communication of the second type consistent with the stored request when the communication of the first type ends.

10. The method of claim 9 wherein the second type of communication includes navigation information.

11. The method of claim 10 wherein the information is presented to the driver via at least one of a heads-up display, speakers, or combinations thereof.

12. The method of claim 10 wherein the information is presented to the passenger via a passenger visual display unit, speakers, or combinations thereof.

13. The method of claim 6, further comprising prioritizing between sequentially received requests for communications of the same type, such that a second request for a communication of a type already in progress will be denied.

14. The method of claim 13, further comprising:

saving the second request; and processing the second request after the communication of the same type already in progress ends.

15. The method of claim 6, further comprising prioritizing between sequentially received requests for communications of the same type, such that a second request for a communication of a type already in progress will terminate the communication already in progress and initiate processing of the second request.

16. The method of claim 1, further comprising annunciating in the vehicle a message indicating the disposition of a request for communication.

17. The method of claim 1 wherein the vehicle includes driver and passenger visual display units, with the driver visual display unit being positioned to be visible by a driver seated in the driver seat, and the passenger display visual display unit positioned to be visible to a passenger seated in the passenger seat and not visible to a driver seated in the driver seat, and also wherein the driver and passenger control units are adapted for requesting a first and a second type of communication, the method further comprising displaying information relating to the first type of communication on the driver visual display unit.

18. The method of claim 17, further comprising displaying limited information relating to the second type of communication on the driver display unit.

19. The method of claim 17 wherein the first type of communication is a telephone call and wherein the second type of communication is a navigation information.

20. The method of claim 1, further comprising presenting information pertaining to the prioritized communication initiation request in a manner that is suitable for the driver or passenger whose generated request is prioritized.

21. An apparatus for communication in a vehicle having a driver seat for a driver and a passenger seat for a passenger, the apparatus comprising:

a telematic unit in the vehicle;

driver and passenger control units for generating a communication request to initiate a communication between the telematic unit and a server; the driver control unit being operable by the driver, and the passenger control unit operable by the passenger, with the passenger control unit being located out of reach of the driver when the driver is seated in the driver seat; and means, located in the telematic unit, for prioritizing communication initiation requests received front the driver and passenger control units.

22. The apparatus of claim 21 wherein the driver and passenger control units are adapted for requesting a first and a second type of communication, and wherein the apparatus further comprises:

driver and passenger visual display units, with the driver visual display unit being positioned to be visible by a driver seated in the driver seat, and the passenger visual display unit being positioned to be visible to a passenger seated in the passenger seat and not visible to a driver seated in the driver seat; and means for displaying only information relating to the that type of communication on the driver visual display unit.

23. The apparatus of claim 22, further comprising means for displaying limited information relating to the second type of communication on the driver display unit.

24. The apparatus of claim 22 wherein the first type of communication is a telephone call and wherein the second type of communication is a navigation information.

25. A communication system for a vehicle, comprising:

a telematic unit including a controller;

a driver control unit, and at least one passenger control unit in communication with the telematic unit wherein the controller is configured to make priority decisions between communication initiation requests from the driver and passenger control units, and between different types of communication.

26. The system of claim 25, further comprising:

a driver visual display unit in communication with the driver control unit; and at least one passenger visual display unit in communication with the at least one passenger control unit.

* * * * *